United States Patent [19]

Schultz et al.

[11] 4,104,783

[45] Aug. 8, 1978

[54] METHOD OF THERMALLY INSULATING A CRYOGENIC STORAGE TANK

[75] Inventors: Jeffrey A. Schultz, East Rochester, N.H.; Paul J. Eifel, Walnut Creek, Calif.

[73] Assignee: Process Engineering, Inc., Plaistow, N.H.

[21] Appl. No.: 845,871

[22] Filed: Oct. 27, 1977

Related U.S. Application Data

[63] Continuation of Ser. No. 741,194, Nov. 12, 1976, abandoned.

[51] Int. Cl.² ............................................. B23P 11/02
[52] U.S. Cl. ...................................... 29/451; 29/452; 29/455 R; 138/149; 220/901
[58] Field of Search ............... 29/452, 450, 451, 455, 29/235; 220/9 C; 242/7.21, 7.22; 138/149

[56] References Cited

U.S. PATENT DOCUMENTS

| | | | |
|---|---|---|---|
| 3,009,600 | 11/1961 | Matsch | 220/9 C UX |
| 3,030,250 | 4/1962 | Losse | 138/149 |
| 3,107,498 | 10/1963 | Messer | 220/9 C UX |
| 3,108,706 | 10/1963 | Matsch et al. | 220/9 C |
| 3,466,733 | 9/1969 | Pajak et al. | 29/455 |
| 3,698,588 | 10/1972 | Pogorski | 220/9 C |
| 3,899,913 | 8/1975 | Schlasser et al. | 29/455 X |
| 3,948,295 | 4/1976 | Lemont et al. | 138/149 X |
| 4,000,826 | 1/1977 | Rogers | 220/9 C X |

*Primary Examiner*—Charlie T. Moon
*Attorney, Agent, or Firm*—Wolf, Greenfield & Sacks

[57] ABSTRACT

Thermal insulation comprised of fiberglass boards or batts having relatively small diameter fiberglass fibers either bound or unbound is wound about the lading container pressure vessel of a tank truck, trailer or rail car. As the insulation is wound about a longitudinal section of the vessel, the insulation is squeezed from its free height to a lesser height to increase the density of the insulation and also permit passage of the outer jacket. The squeezing is preferably accomplished by wrapping each layer of insulation with a continuous wire mesh. The tension is maintained with the use of a long rod intertwined in the wire mesh, which rod is withdrawn after a section of the outer jacket is over a section of the vessel thereby permitting the insulation to expand and substantially fill the void between the vessel and outer jacket.

5 Claims, 4 Drawing Figures

METHOD OF THERMALLY INSULATING A CRYOGENIC STORAGE TANK

This is a continuation of application Ser. No. 741,194, filed Nov. 12, 1976, now abandoned.

BACKGROUND OF THE INVENTION

The present invention relates to an improved thermal insulation system for mobile cryogenic tanks and the method of installing the thermal insulation in particular between a lading container vessel and its associated outer protective jacket.

Presently the insulation that is used in the vacuum space between the vessel and the jacket of a cryogenic tank is a perlite powder. However, there are at least two disadvantages associated with this form of insulation. In the first place, this known insulation has a higher thermal conductivity in the (insulation) pressure range of 5000 microns of mercury to atmospheric pressure than the system of the present invention. Accordingly, one object of the present invention is to provide a thermal insulation for use in cryogenic vessels such as tank trucks, trailers, and railroad cars having a relatively low thermal conductivity especially over a pressure range of about 5000 microns of mercury to atmospheric pressure. This low thermal conductivity over a pressure range even up to atmospheric pressure is important in reducing the heat transfer from ambient to the lading container in the event a shipping vacuum is lost either due to accident or malfunction. This is especially critical in the transportation of hazardous materials or where increased heat transfer may cause premature and excessive venting of the commodity into the atmosphere.

Another disadvantage associated with the use of powder insulation is that the powder tends to settle thus exposing parts of the top of the tank which are uninsulated. This causes an increase in heat transfer to the commodity within the inner vessel. Also, there is no simple way of detecting the settling of this powder insulation. The only way to remedy the situation regarding the powder insulation is to open the jacket and refill the insulation. However, this is a costly and time consuming further additional procedure.

Accordingly, another object of the present invention is to provide a thermal insulation for a cryogenic tank truck wherein the insulation is non-settling providing uniform insulation about the entire tank.

A further object of the present invention is to provide an improved insulation system for use primarily in insulating cryogenic tank trucks, trailers and railroad cars.

Still another object of the present invention is to provide an improved method of insulating a cryogenic tank container.

SUMMARY OF THE INVENTION

To accomplish the foregoing and other objects of this invention there is provided a thermal insulation system for use with cryogenic storage tanks such as tank trucks, trailers and railroad cars. This system comprises, in combination, a container vessel for the cryogenic liquid and an outer jacket about the vessel and defining a space therebetween which is to be at least partially evacuated for insulation purposes. The system of this invention comprises fiberglass insulation means which is wrapped about the vessel to substantially fill the space. Mesh means is also wrapped about the fiberglass insulation means for holding the fiberglass insulation means in place.

In accordance with the method of the present invention the container vessel is preferably insulated in three sections including the two end sections and a center section. The insulation system of the invention is essentially installed concurrently with the assembling and welding together of the three sections of the container vessel. The method of installing the insulation is essentially the same for each section of the container vessel.

The insulation is wrapped about the cylindrically shaped vessel preferably three times. A wire mesh means is preferably provided and is secured at one end to stud means on the vessel. The fiberglass insulation means is wrapped under the wire mesh means and the wire mesh means is held somewhat taut so as to compress the fiberglass insulation means. With the mesh somewhat taut and the fiberglass insulation means compressed the insulation and mesh can be wrapped a plurality of times about the vessels and an elongated rod may be used intertwined in the mesh to hold the mesh taut and in turn the insulation compressed. A section of the outer jacket is then passed over the vessel and wrapped insulation system. The rod may then be withdrawn to permit expansion of the insulation to substantially fill the void space defined between the vessel and the larger diameter outer jacket. After one end of the vessel has been wrapped and an end of the outer jacket has been secured in place then the insulation system of this invention is installed in a similar manner at an inner section of the vessel and thereafter at the other end section of the vessel.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

The drawings depict only a segment of the overall storage container that is used for storing cryogenic liquids. The inner vessel is usually fabricated in two or three sections that are welded together in a predetermined sequence as the insulation system is applied and as the outer jacket also is fitted over the inner vessel. The outer jacket also is preferably constructed in three separate sections including two longer end sections and a relatively short middle section. The inner vessel and the outer jacket are supported relative to each other by at least one support cone welded in place therebetween. In the usual sequence of operation one end of the vessel is insulated, followed by the insulation of the center section of the vessel in turn followed by the insulation of the opposite end of the vessel. For some applications requiring relatively small storage tanks the entire inner vessel may be wrapped in essentially a one-step operation.

Figure 2:
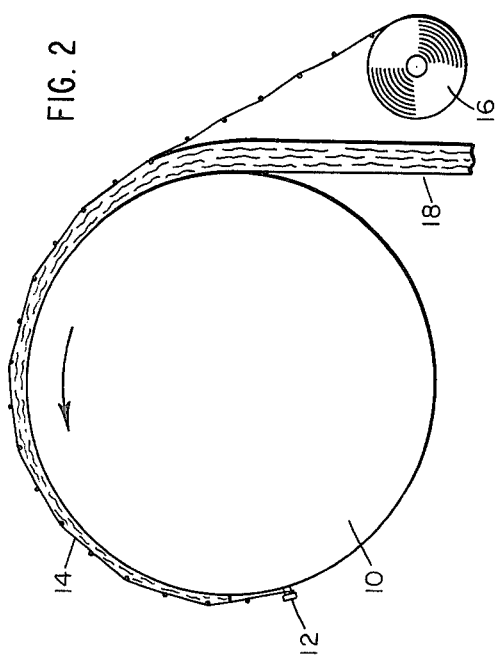
FIG. 2 is a somewhat schematic view depicting the wrapping about the inner vessel.
Figure 1:
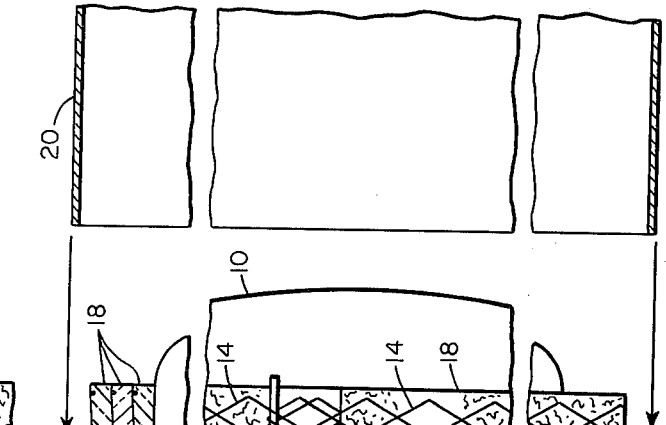
FIG. 1 shows a section of the inner vessel at an initial step of applying the insulation system of this invention.
Figure 1:
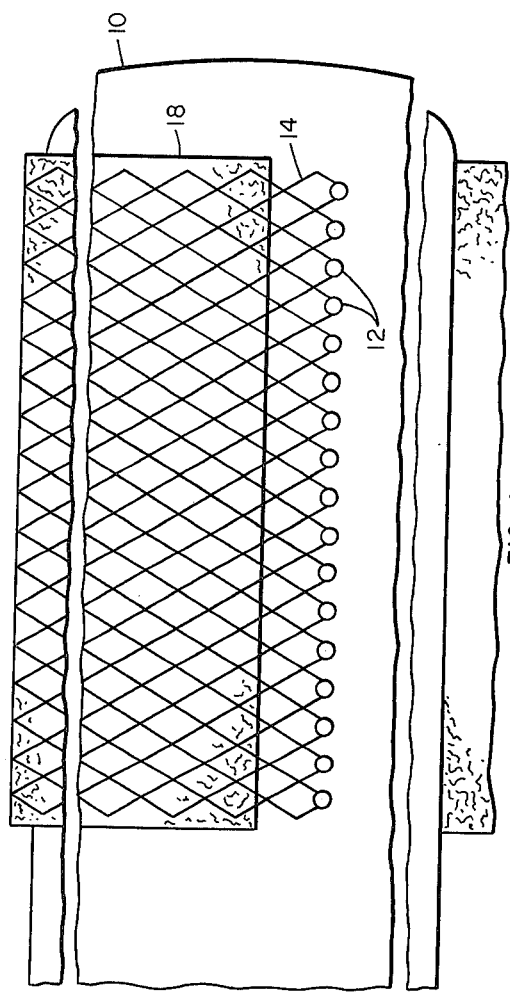

Referring now to the drawings and in particular to FIGS. 1 and 2 there is shown a section of inner vessel 10 which may be fabricated of SA-240 type 304 stainless steel. The section of the vessel 10 shown in FIG. 1 is welded to at least one other section to complete the entire closed vessel in which the cryogenic liquids are to be stored. A plurality of studs 12 are longitudinally arranged and are welded to the inner vessel 10. As shown in FIG. 2 the wire mesh 14 is secured along one end to the studs 12 and the studs 12 are provided with an enlarged head for holding the mesh securely. The wire mesh 14 is unwound from a roll 16 and as the wire mesh is rolled about the vessel section 10 a compressible fiberglass insulation 18 is compressed between the wire mesh and the vessel. In the embodiment shown in FIG. 2 the wire mesh and the insulation are wound about the vessel by rotating the vessel as shown by the arrow in FIG. 2. The insulation is preferably constructed of small diameter fiberglass fibers (grade AA to grade B) either unbound or bound by heat or organic binders and is preferably provided in boards or batts having a density of approximately 1 lb. per cu. ft. to 3 lbs. per cu. ft. As the mesh and insulation are wrapped about the vessel the insulation is compressed by maintaining the mesh taut. This squeezing action has the effect of increasing the density of the insulation to a preferred density range of from 4–6 lbs. per cu. ft.

Figure 4:
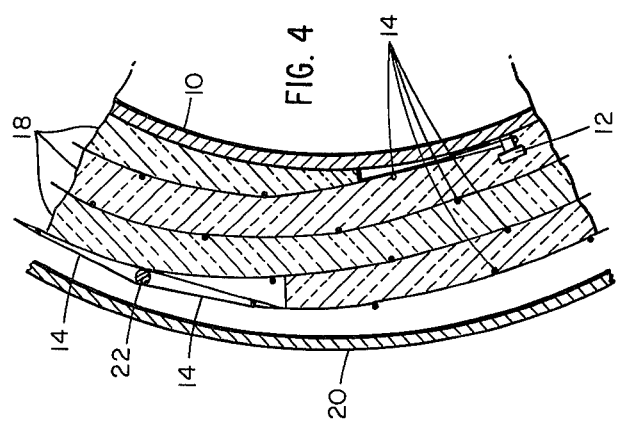
FIG. 4 is a fragmentary view showing the vessel, jacket insulation system and securing rod in cross-section.
Figure 3:
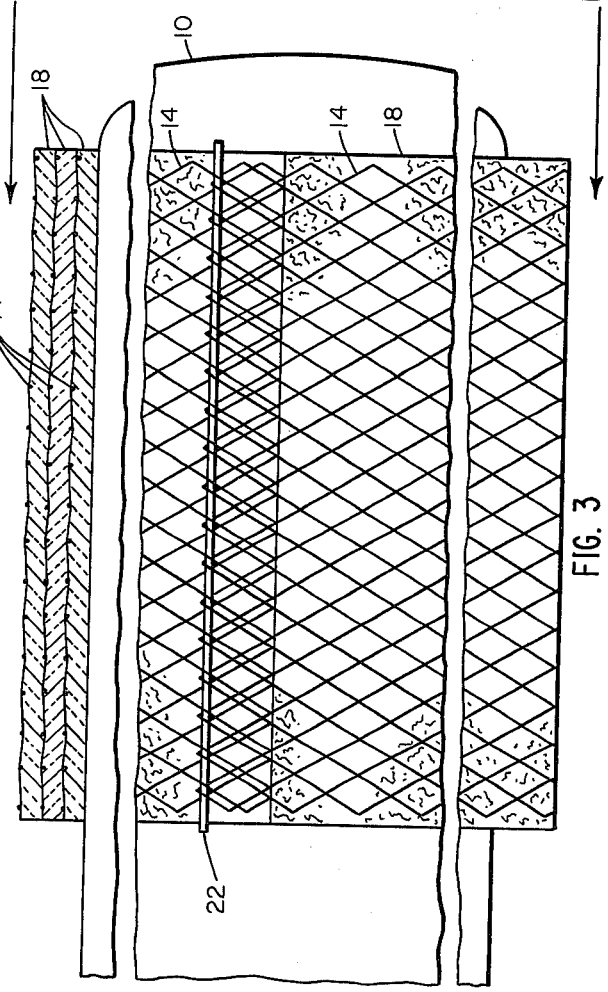
FIG. 3 shows the insulation completely wrapped around the inner vessel with the outer jacket about to be fitted over the inner vessel.

FIGS. 3 and 4 show a later stage in the method of applying the insulation to the cryogenic vessel. In the preferred embodiment the mesh and insulation is wrapped about the vessel three times. To secure the mesh in its taut condition and also to maintain the insulation compressed so that the outer jacket 20 can be slid over the inner vessel, there is provided an elongated rod or bar 22 which threads between the top wrap and the next lower wrap to maintain the wire mesh taut. The jacket or jacket section 20 is then slid over the compressed insulation and wire mesh. The bar 22 may then be withdrawn to allow the insulation to expand to the interior walls of the jacket. The space between the jacket 20 and vessel 10 is then evacuated to a pressure of, for example, 100 microns of mercury. At this pressure and at a density of 4 lbs. per cu. ft. and with a mean temperature of $-120°$ F. the insulation of this invention has a thermal conductivity of about 0.05 BTU-in/hr/sq.ft./° F. At atmospheric pressures under the same conditions, the insulation of this invention has a thermal conductivity of 0.16 BTU-in/hr/sq.ft./° F.

Each section of the vessel can be wrapped in a similar manner as discussed with reference to FIGS. 1–4. Also, a conventional support system may be used for supporting the vessel 10 relative to the jacket 20. For example, a conical support may be welded to the open end of one end section of the vessel. This conical support is also welded to one end section of the outer jacket. The conical support is preferably provided at a central area of the overall length of the container.

What is claimed is:

1. A method of insulating a cryogenic storage tank having a container vessel and an outer jacket with a space to be evacuated therebetween, comprising the steps of:
   providing a fiberglass insulation means,
   wrapping the insulation means about at least a section of the vessel,
   providing a pervious means,
   securing an end of the pervious means to the vessel,
   wrapping the pervious means about the vessel with the insulation means being concurrently wrapped therewith,
   securing the pervious means at another end so that the insulation means is compressed,
   and fitting the jacket at least partially over the vessel.

2. A method as set forth in claim 1 wherein said previous means includes a mesh means that is wrapped about the vessel and comprising the further step of unsecuring the mesh means after the jacket is fitted to permit expansion of the fiberglass insulation means.

3. A method as set forth in claim 2 wherein the mesh means is wrapped over the fiberglass insulation means.

4. A method as set forth in claim 2 wherein the mesh means is secured by an elongated rod which is later withdrawn to permit expansion of the fiberglass insulation means.

5. A method as set forth in claim 2 wherein the insulation means is compressed from a normal density in the range of 1–3 pounds per cubic foot to a density in the range of 4–6 pounds per cubic foot.

* * * * *